United States Patent [19]

Tavss et al.

[11] Patent Number: 4,693,396
[45] Date of Patent: Sep. 15, 1987

[54] LAMINATE SUBSTRATE AND ARTICLE THEREFROM INCORPORATING FLUORINATED POLYETHYLENE

[75] Inventors: Edward A. Tavss, Kendall Park, N.J.; Samuel Temin, Needham, Mass.; John Santalucia, East Brunswick; Davis L. Carroll, Piscataway, both of N.J.

[73] Assignee: Colgate-Palmolive Company, New York, N.Y.

[21] Appl. No.: 902,120

[22] Filed: Sep. 2, 1986

Related U.S. Application Data

[63] Continuation of Ser. No. 687,561, Dec. 28, 1984, abandoned.

[51] Int. Cl.[4] .............................................. B65D 35/08
[52] U.S. Cl. ....................................... 222/107; 428/35; 428/464; 428/511
[58] Field of Search ............... 428/35, 511, 464, 421; 222/92, 107, 215; 206/484.2, 524.1–524.3; 525/356

[56] References Cited

U.S. PATENT DOCUMENTS

| | | | |
|---|---|---|---|
| 3,295,725 | 1/1967 | Brandt | 222/107 |
| 3,647,613 | 3/1972 | Scotland | 428/421 X |
| 3,832,964 | 9/1974 | Rockefeller | 222/92 X |
| 4,020,223 | 4/1977 | Dixon et al. | 428/224 |
| 4,110,518 | 8/1978 | Gilmour et al. | 429/174 |
| 4,142,032 | 2/1979 | D'Angelo | 526/43 |
| 4,257,536 | 3/1981 | Hilmar | 222/107 |
| 4,265,948 | 5/1981 | Hayes et al. | 428/35 |
| 4,296,151 | 10/1981 | Boultinghouse | 427/255.1 |
| 4,404,256 | 9/1983 | Anand et al. | 428/409 |

Primary Examiner—Joseph J. Rolla
Assistant Examiner—Michael S. Huppert
Attorney, Agent, or Firm—Eric P. Schellin

[57] ABSTRACT

There is disclosed a substrate of layers of materials comprising fluorinated polyethylene layers having sandwiched therein between a metal foil layer and a paper layer all suitably adhered to one another. It is also contemplated that the substrate be employed in fabricating a dentifrice tube.

10 Claims, 2 Drawing Figures

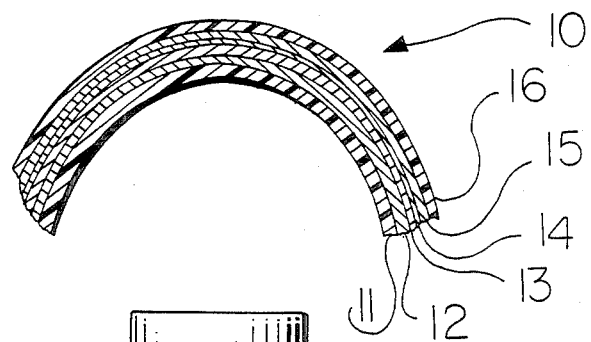
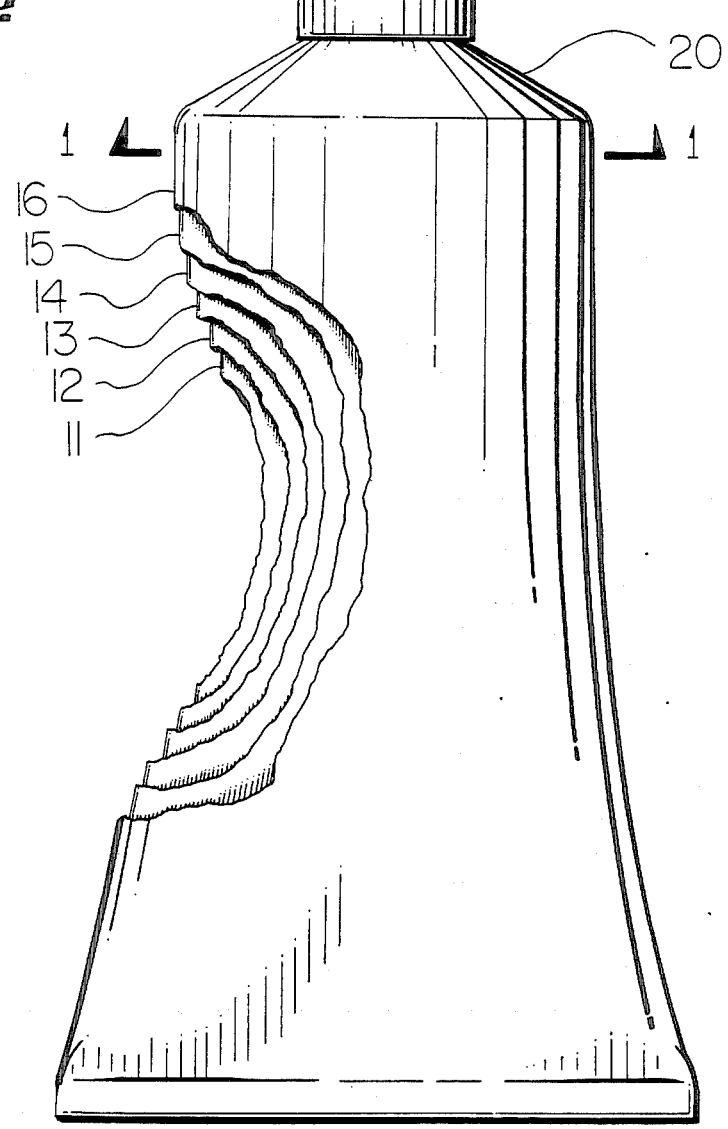

LAMINATE SUBSTRATE AND ARTICLE THEREFROM INCORPORATING FLUORINATED POLYETHYLENE

This application is a continuation of application Ser. No. 687,561, filed Dec. 28, 1984 now abandoned.

FIELD OF THE INVENTION

The present invention relates broadly to the container art, and is more particularly concerned with a collapsible dispensing container of laminated wall construction in the body portion thereof, whereby product permeation and absorption, and oxygen absorption are substantially prevented in all regions of the container structure susceptible thereto.

BACKGROUND OF THE INVENTION

Collapsible tubes formed of metallic and plastic materials have long been known in the packaging field. Extruded metal tubes are inherently brittle and repeated use not infrequently results in wall cracks so that product is exuded from a location other than the essentially rigid dispensing orifice. Of the prior art metal tubes, aluminum tubes, while probably being the least brittle, are somewhat limited in their applications since up to the present time it has not been possible to apply to the interior surfaces thereof a completely satisfactory coating, when required to prevent attack and corrosion of the metal by alkaline or acid contents and contamination of the contents by the reaction products. Notwithstanding the relatively brittle nature of a metal tube, the mentioned internal coating operation requires an additional processing step which necessarily increases the cost of the final article.

Tubes formed of polyethylene and other plastic materials have enjoyed wide commercial success in the packaging of many products; however, certain other products after a time have been noted to deteriorate when contained therein. Plastics as exemplified by polyethylene are permeable to a degree when employed in the wall thicknesses used in tubular containers, and the essential oils embodied in most dentifrices for flavoring purposes are reduced in volume during storage of the container, rendering the dentifrice less palatable. Also, the plastic container wall absorbs oxygen over a period of time and ultimately may decompose the product, which has actually been found to be the case with fluoride-containing toothpastes. A further disadvantage of a plastic tube resides in the inability of the surface to readily receive printing or decorative material. In addition, plastic tubes, as exemplified by polyethylene, have a memory effect; that is, they do not remain compressed when squeezed, a particular disadvantage for dentifrice tubes.

To counter the above problems, it has accordingly been proposed to provide a metallic foil barrier between the product and the polyethylene tube body. This would counter the compressibility problem in that the metal layer would impose its compressibility upon the plastic. In addition, the metallic foil barrier between the product and the polyethylene tube body would prevent the mentioned loss of essential oils and the absorption of oxygen. The metallic barrier has been suggested as an interlayer between facing sheets of polyethylene, and that a laminate be formed by heat with or without suitable adhesives. However, while a structure of this general character is effective to prevent some product permeation and oxygen absorption through the tube body, and particularly when the inner thermoplastic layer is a copolymer of ethylene and a polar group containing monomer which is co-polymerizable therewith, there remains the possibility of product deterioration albeit to a much lesser extent.

PRIOR ART

Attention is directed to the following prior art:

Brandt (U.S. Pat. No. 3,295,725) developed a tube which combines above advantages of an aluminum tube with advantages of a plastic tube. This is a laminated collapsible dispensing container containing both a metallic barrier and a polyethylene inner wall. The thermoplastic layer is broadly described as polyolefin and a copolymer of an olefin and a polar group containing monomer which is copolymerizable therewith. This laminate overcomes the above described limitations, except for absorption of the essential oils from the dentifrices.

Marchak (Can Pat. No. 728,525) also developed a laminated tube containing an inner layer of polyethylene. He acknowledged the problem of absorption of flavor oil by the thermoplastic wall.

Other inventors investigated surface treated polymers in their articles of manufacture. D'Angelo (U.S. Pat. No. 4,142,032) in his studies with films and containers noted that barrier properties are improved by surface treatment with both fluorine and bromine. However, he did not make a tube; his article had no aluminum; and he did not recognize the flavor barrier properties of this polymer.

Boultinghouse (U.S. Pat. No. 4,296,151), Gilmour (4,110,518), Dixon (U.S. Pat. No. 4,020,223), Scotland (U.S. Pat, No. 3,647,613), and Anand (U.S. Pat. No. 4,404,256) also had articles of manufacture involving fluorine surface treated polymers. Boultinghouse demonstrated that the treatment made surfaces receptive to adhesives, coating, paints, inks, decorations, and the like; Gilmour showed that the surface behaves as an electrical insulator; Dixon's treatment imparted oil stain release characteristics; Scotland's treatment provided solvent resistance. None of these articles, however, were tubes; none contained a layer of aluminum; and none of the inventors noted the flavor resistance of these articles.

SUMMARY OF THE INVENTION

It is, therefore, an important aim of the present invention to provide a collapsible dispensing container of laminated wall construction in the body portion.

Another object of this invention lies in the provision of a tubular container having a plurality of adherent layers in the body portion thereof, one of said layers providing a barrier to product migration and oxygen absorption such as a metallic foil and another of said layers being a fluorinated polyethylene or mixture thereof varying in density and crystallinity. The latter layer being innermost and preferably outermost with different additional laminae sandwiched therein between.

Such additional layers comprise paper and suitable adhesive and bonding agents such as copolymer of ethylene and acrylic acid.

The collapsible dispensing container of the present invention may be constructed from the laminated substrate of the present invention by conventional and known apparatuses. Exemplary of such equipment and method can be discerned from U.S. Pat. No. 3,832,964, which is incorporated herein by reference.

A further object of the instant invention is to provide a method of producing laminated tubes in which a tubular body is formed of a barrier layer and a fluorinated polyethylene laminated thereto; the laminated tube body is then located on a forming member in adjacency to a barrier member also positioned thereon.

Other objects and advantages of the invention will become more apparent as the description proceeds.

BRIEF DESCRIPTION OF THE DRAWINGS

In the drawings wherein like numerals are employed to designate like parts throughout the same:

FIG. 1 is a cross-sectional view of a fragmentary portion of a laminated substrate of the present invention.

FIG. 2 is a side elevational view of a collapsible dispensing container embodying the novel concepts of this invention, with portions of the body walls being broken away to more fully illustrate the laminated structure.

DETAILED DESCRIPTION OF THE INVENTION

The thermoplastic of the present invention is fluorinated polyethylene.

Referring now first to FIG. 1 of the drawings, a substrate 10 is shown in cross-section whereby to reveal the components of the sandwich that go to make up the laminated configuration.

It will be seen that the bottommost layer 11 is a fluorinated polyethylene. The second layer 12 thereabove is an adhesive layer which joins the fluorinated polyethylene layer 11 with third layer 13 which is a metal foil such as aluminum foil. The fourth layer 14 is another adhesive that adhesively secures the other surface of the metal foil layer 13 to a paper layer 15. The topmost layer 16 is fluorinated polyethylene.

The fluorinated polyethylenes are particularly useful because they have very low flavor absorption characteristics as can be seen from the following tables where fluorinated polyethylenes are compared with polyethylene where the thicknesses of the layers or coating are the same:

TABLE I

Relative Flavor Absorption into Polymers from Flavored Dentifrice*

|  | 72° F. | 90° F. | 120° F. |
|---|---|---|---|
| Aluminum | 0.4 | 0 | 0.4 |
| Fluorine surface-treated high density polyethylene HD-3 (Air Products) | 22 | 37 | 90 |
| High density polyethylene HD-0 (Air Products) | 98 | 94 | 100 |
| Low density polyethylene LD-0 (Air Products) | 100 | 94 | 111 |

*All numbers relative to low density polyethylene at 72° F., arbitrarily set at 100; the lower the number the less flavor absorbed.

TABLE II

Polymer Absorption of Neat Flavor Oil

|  | Absorption (%) |
|---|---|
| Aluminum | 0 |
| Fluorine surface-treated high density polyethylene HD-3 (Air Products) | 3.3 |
| High density polyethylene HD-0 (Air Products) | 4.8 |
| Low density polyethylene LD-0 (Air Products) | 7.9 |

TABLE II-continued

Polymer Absorption of Neat Flavor Oil

|  | Absorption (%) |
|---|---|
| Low density polyethylene NA (USI) | 10.0 |
| Ionomer Surlyn 1707 (DuPont) | 15.7 |
| Ionomer Surlyn 1605 (DuPont) | 19.0 |
| Ionomer Surlyn 1706 (DuPont) | 24.3 |

TABLE III

Polymer Absorption of Neat Flavor Oil

|  | % Flavor Absorbed |
|---|---|
| No. 74 fluorine surface-treated Low density polyethylene[a] | 2.6 |
| No. 76 fluorine surface-treated Low density polyethylene[a] | 2.6 |
| Low density polyethylene[b] | 5.5 |
| Low density polyethylene (control)[a] | 5.6 ± 0.14[e] |
| Ionomer[c] | 7.4 |
| Ionomer[d] | 12.2 |

[a]Low density polyethylene is Lupolen 1804H (BASF)
[b]Tenite 154 (Eastman)
[c]Surlyn 8940 (DuPont)
[d]Surlyn 8920 (Dupont)
[e]n = 3

TABLE IV

Loss of Flavor from Flavored Dentifrice into Polymers

|  | Flavor Loss* |
|---|---|
| No. 76 fluorine surface-treated low density polyethylene[a] | 56 |
| No. 74 fluorine surface-treated low density polyethylene[a] | 64 |
| Ionomer[b] | 88 |
| Ionomer[c] | 96 |
| Low density polyethylene (control)[a] | 100 |
| Low density polyethylene[d] | 136 |

*Relative to BASF low density polyethylene control arbitrarily set at 100; the lower the number the less flavor lost from the dentifrice
[a]LDPE is Lupolen 1804H (BASF)
[b]Surlyn 8920 (DuPont)
[c]Surlyn 8940 (DuPont)
[d]Tenite 154 (Eastman)

It is contemplated that within the purview of the invention the adhesive may be a copolymer of ethylene and acrylic acid or methacrylic acid, or sodium or zinc salts thereof in a diluent system. The metal foil may be preferably aluminum foil. The paper layer is desirably a kraft paper. The thickness range of each of the layers is as follows:

Fluorinated polyethylene layer 11 0.5 mils to 3.0 mils, preferably 1.0 mils

Adhesive layer 12—sufficient to assure adherence

Metal foil layer 13—0.5 mils to 2.0 mils, preferably 1.0 mils.

Adhesive layer 14—sufficient to assure adherence

Paper layer 15—1.5 mils to 2.5 mils, preferably 2.0 mils.

Fluorinated polyethylene layer 16—3.5 mils to 5.0 mils, preferably 4.0 mils.

The topmost fluorinated polyethylene layer 16 adheres to the paper layer 15 by means of the application of sufficient heat and pressure to the substrate. In the event the application of heat and pressure is not appropriate a suitable adhesive is to be employed. FIG. 2 is an example of the laminated structure of a collapsible container with the layers being demonstrated as in FIG. 1 with layer 11 being inner most and the other layer being of the same materials and in the same order as shown.

It is believed manifest from the foregoing that applicant has provided a collapsible container structure which substantially reduces the problems heretofore unsolved by the prior art. The laminated substrate and laminated shoulder piece 20 substantially eliminates product permeation and oxygen absorption.

The outer layer of a fluorinated polyethylene is a thermoplastic capable of fusion during a side seaming step and granting adequate protection to the paper and metallic foil interlayer. The art of seaming of a collapsible dentifrice tube of the general type herein disclosed can be seen in U.S. Pat. No. 3,295,725, incorporated herein by reference. However, the outer layer of fluorinated polyethylene and paper may be eliminated if the foil barrier is of sufficient thickness to resist damage, and by flowing a thermoplastic material into the overlap side seam during the sealing thereof when such a system is employed.

Further, the outer layer may be paper in a three-ply laminate formed of paper, foil and fluorinated polyethylene as described. As the outermost and innermost layers are preferably the same, the folded edges of the tube produced from the substrate in conveniently heat bonded. A suitable adhesive can be used when heat bonding is not possible. This modification is in addition to the aforementioned four-ply laminate comprised of from outside to in, fluorinated polyethylene, paper, foil and fluorinated polyethylene.

It is contemplated that suitable adhesives will be employed between the laminae whenever necessary. Fluorinated polyethylene can also be employed for the shoulder piece, cap, neck piston and in the construction of dispensing valves for other dentifrice dispensers, particularly in conjunction with the interior portions exposed to the contained dentifrice, and, again, where required, compatible adhesives would naturally be employed.

Additionally when cast as a film on the interior surfaces of fiber drums used for the storage of flavored dentifrice, the material will retard flavor loss into the drums, thereby extending storage life.

Various modifications of the invention have been disclosed herein, and these and other changes can of course be effected without departing from the novel concepts of the instant contribution.

What is claimed is:

1. A substrate of collapsible layers of materials having low flavor percentage absorption characteristics of 2.6% comprising a first innermost layer of a fluorinated polyethylene of a thickness range of from about 0.5 to about 3.0 mils, a second layer of metal foil of a thickness range of from about 0.5 to 2.0 mils, a third layer of paper of a thickness range of from about 1.5 to about 2.5 mils and a fourth outermost layer of a fluorinated polyethylene which is thicker than said first layer, and ranges from about 3.5 to about 5.0 mils in thickness.

2. The substrate of claim 1 wherein the first layer of the fluorinated polyethylene is secured to the metal foil with an adhesive.

3. The substrate of claim 1 wherein the third layer of paper is secured to the fourth layer of the fluorinated polyethylene with an adhesive.

4. The substrate of claim 1 wherein the first layer of the fluorinated polyethylene is secured to the metal foil with an adhesive and wherein the third layer of paper is secured to the fourth layer of the fluorinated polyethylene with an adhesive.

5. The substrate of claim 4 wherein the adhesive is a copolymer of ethylene and acrylic acid.

6. A collapsible paste dispensing container of layers of materials having low flavor percentage absorption characteristics of 2.6% comprising a first innermost layer of fluorinated polyethylene of a thickness range of from about 0.5 to about 3.0 mils, a second layer of metal foil of a thickness range of from about 0.5 to 2.0 mils, a third layer of paper of a thickness range of from about 1.5 to about 2.5 mils, and an outermost fourth layer of a fluorinated polyethylene which is thicker than said first on layer and ranges from about 3.5 to about 5.0 mils in thickness.

7. The container of claim 6 wherein the first layer of the fluorinated polyethylene is secured to the metal foil with an adhesive.

8. The container of claim 6 wherein the third layer of paper is secured to the fourth layer of the fluoropolymer with an adhesive.

9. The container of claim 6 wherein the first layer of the fluorinated polyethylene is secured to the metal foil with an adhesive and wherein the third layer of paper is secured to the fourth layer of the fluorinated polyethylene with an adhesive.

10. The container of claim 9 wherein the adhesive is a copolymer of ethylene and acrylic acid.

* * * * *